US012687926B2

(12) United States Patent
Liu et al.

(10) Patent No.: US 12,687,926 B2
(45) Date of Patent: Jul. 21, 2026

(54) EYE TRACKING WITH TWO-DIMENSIONAL COLLISION DETECTION AREA AND DETERMINED INTERACTIVE COMPONENT

(71) Applicants: Beijing Zitiao Network Technology Co., Ltd., Beijing (CN); LEMON INC., Grand Cayman (KY)

(72) Inventors: Mengqian Liu, Beijing (CN); Shuo Liu, Beijing (CN); Ke Jing, Los Angeles, CA (US); Chi Fang, Beijing (CN); Jia Guo, Beijing (CN)

(73) Assignees: Beijing Zitiao Network Technology Co., Ltd., Beijing (CN); LEMON INC., Grand Cayman (KY)

( * ) Notice: Subject to any disclaimer, the term of this patent is extended or adjusted under 35 U.S.C. 154(b) by 0 days.

(21) Appl. No.: 19/010,402

(22) Filed: Jan. 6, 2025

(65) Prior Publication Data

US 2025/0224802 A1 Jul. 10, 2025

(30) Foreign Application Priority Data

Jan. 5, 2024 (CN) .......................... 202410024039.0

(51) Int. Cl.
*G06F 3/0481* (2022.01)
*G06F 3/01* (2006.01)
*G06F 3/04886* (2022.01)

(52) U.S. Cl.
CPC ............ *G06F 3/013* (2013.01); *G06F 3/0481* (2013.01); *G06F 3/04886* (2013.01); *G06F 2203/04803* (2013.01)

(58) Field of Classification Search
CPC .... G06F 3/013; G06F 3/0481; G06F 3/04886; G06F 2203/04803
See application file for complete search history.

(56) References Cited

U.S. PATENT DOCUMENTS

| | | | |
|---|---|---|---|
| 12,118,200 B1 * | 10/2024 | Shutzberg ............. | G06F 3/0482 |
| 2022/0155859 A1 * | 5/2022 | Yan ...................... | G06V 40/193 |
| 2024/0103613 A1 * | 3/2024 | Chawda ................ | G06F 3/0304 |

FOREIGN PATENT DOCUMENTS

| | | |
|---|---|---|
| CN | 109240497 A | 1/2019 |
| CN | 115793848 A | 3/2023 |

* cited by examiner

*Primary Examiner* — Afroza Chowdhury
(74) *Attorney, Agent, or Firm* — Alleman Hall LLP

(57) ABSTRACT

Embodiments of this application provide an eye tracking method and apparatus, a device, a medium, and a program. By obtaining a sight start point, a sight direction, and a fixation point on a 2D interactive panel of a user, and a size parameter of a collision detection area, a position of the collision detection area is determined based on a position of the fixation point and the size parameter of the collision detection area; An interactive candidate component collided with the collision detection area is determined based on the position of the collision detection area and positions of interactive components on the interactive panel; when there are a plurality of candidate components in the interactive panel, one interactive component is determined from the plurality of candidate components based on position relationships between the plurality of candidate components and the sight start point, the sight direction.

20 Claims, 10 Drawing Sheets

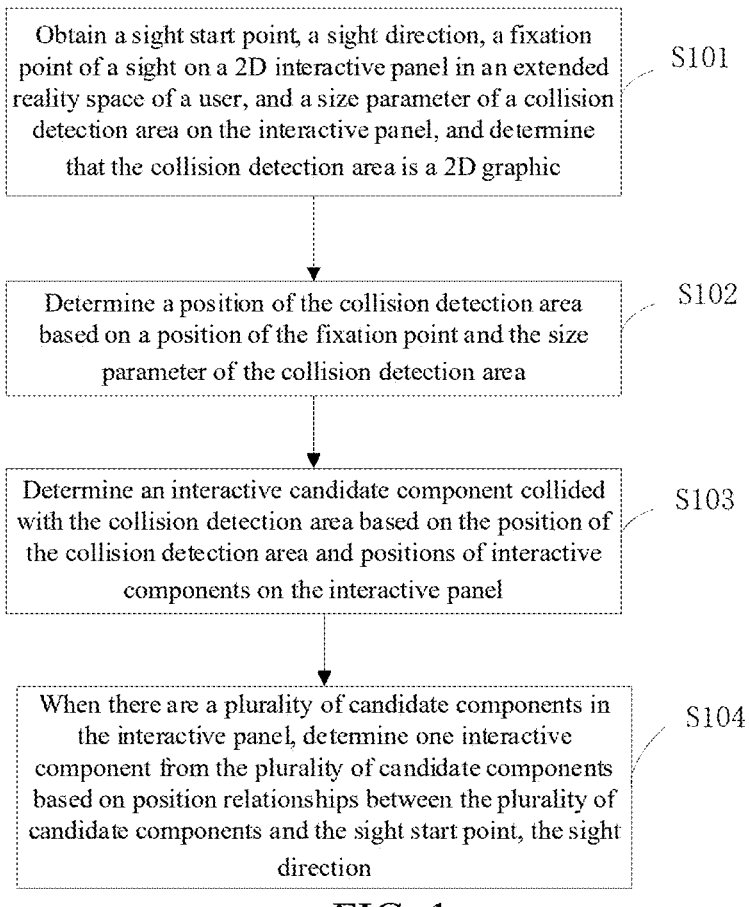

Obtain a sight start point, a sight direction, a fixation point of a sight on a 2D interactive panel in an extended reality space of a user, and a size parameter of a collision detection area on the interactive panel, and determine that the collision detection area is a 2D graphic ⟋ S101

Determine a position of the collision detection area based on a position of the fixation point and the size parameter of the collision detection area ⟋ S102

Determine an interactive candidate component collided with the collision detection area based on the position of the collision detection area and positions of interactive components on the interactive panel ⟋ S103

When there are a plurality of candidate components in the interactive panel, determine one interactive component from the plurality of candidate components based on position relationships between the plurality of candidate components and the sight start point, the sight direction ⟋ S104

FIG. 1

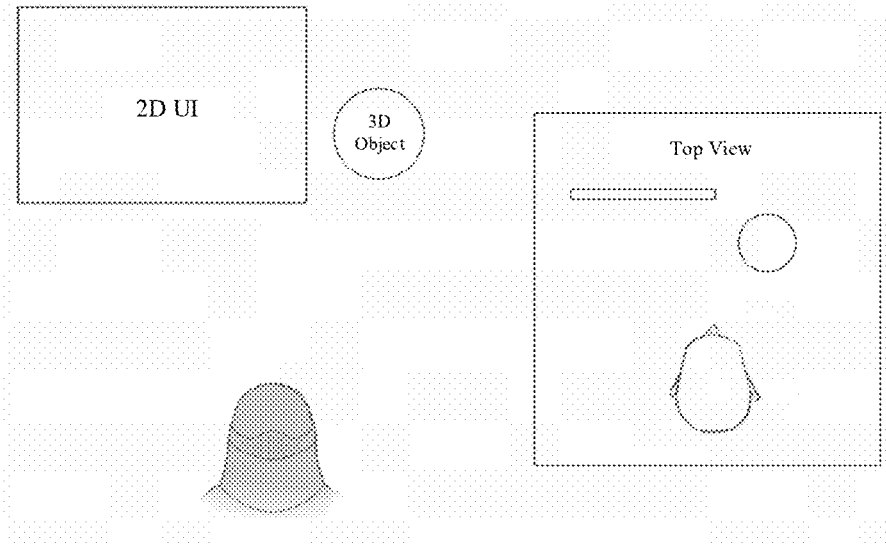

FIG. 2

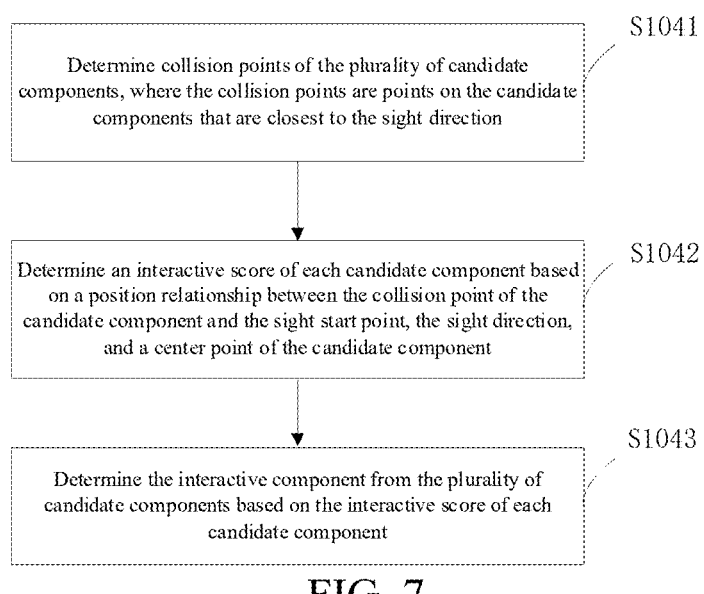

Determine collision points of the plurality of candidate components, where the collision points are points on the candidate components that are closest to the sight direction    S1041

Determine an interactive score of each candidate component based on a position relationship between the collision point of the candidate component and the sight start point, the sight direction, and a center point of the candidate component    S1042

Determine the interactive component from the plurality of candidate components based on the interactive score of each candidate component    S1043

FIG. 7

Fixation point located in candidate component

Fixation point located outside candidate component

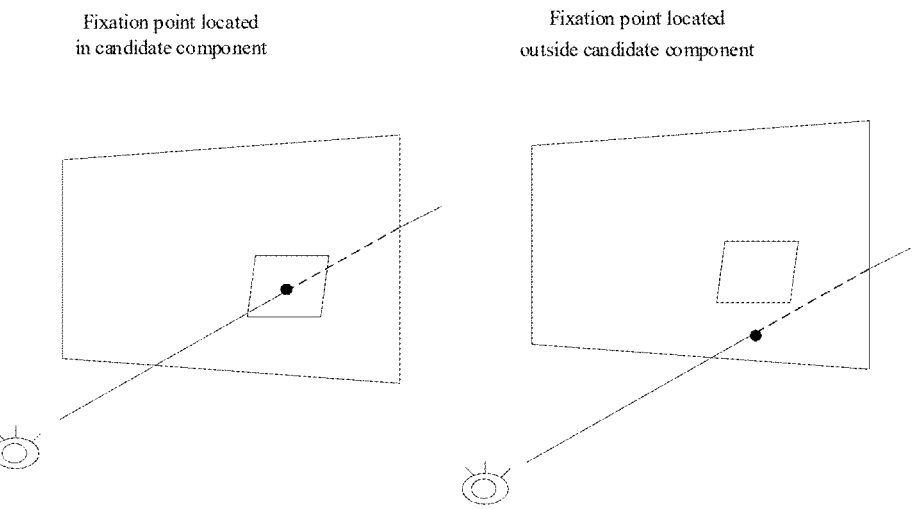

FIG. 8

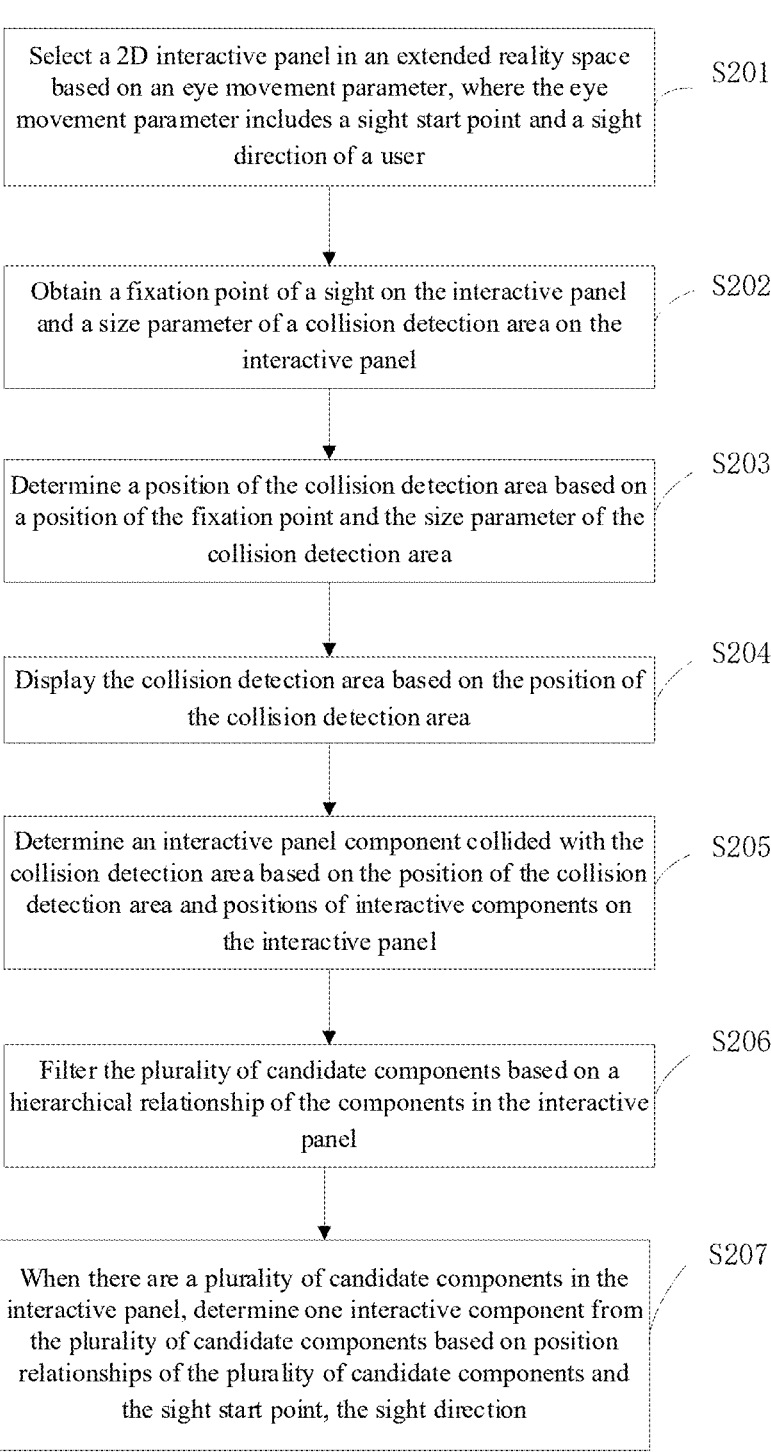

Select a 2D interactive panel in an extended reality space based on an eye movement parameter, where the eye movement parameter includes a sight start point and a sight direction of a user — S201

Obtain a fixation point of a sight on the interactive panel and a size parameter of a collision detection area on the interactive panel — S202

Determine a position of the collision detection area based on a position of the fixation point and the size parameter of the collision detection area — S203

Display the collision detection area based on the position of the collision detection area — S204

Determine an interactive panel component collided with the collision detection area based on the position of the collision detection area and positions of interactive components on the interactive panel — S205

Filter the plurality of candidate components based on a hierarchical relationship of the components in the interactive panel — S206

When there are a plurality of candidate components in the interactive panel, determine one interactive component from the plurality of candidate components based on position relationships of the plurality of candidate components and the sight start point, the sight direction — S207

FIG. 15

EYE TRACKING WITH TWO-DIMENSIONAL COLLISION DETECTION AREA AND DETERMINED INTERACTIVE COMPONENT

CROSS-REFERENCE TO RELATED APPLICATIONS

The present application claims the benefit of priority to the Chinese patent application No. 202410024039.0 filed with Chinese Patent Office on Jan. 5, 2024, which is hereby incorporated by reference in its entirety into the present application.

TECHNICAL FIELD

Embodiments of this application relate to the field of artificial intelligence, and in particular, to an eye tracking method and apparatus, a device, a medium, and a program.

BACKGROUND

Extended reality (XR) refers to combining reality with virtuality through a computer to create a virtual environment that can be interacted with by a person. XR is also a general term for various technologies such as virtual reality (VR), augmented reality (AR), and mixed reality (MR). By integrating visual interaction technologies of the three, an "immersive feeling" of seamless conversion between the virtual world and the real world is brought to experiencers.

An XR device may interact with a user by using an eye tracking interaction manner. The XR device obtains fixation parameters such as eye fixation point coordinates and a fixation direction, and controls an interactive ray (for example, a gesture ray or a handle ray) in an extended reality space to move based on the fixation parameters. A start point of the ray moves along with the fixation point of the user, so that the ray points to where the user is looking. However, accuracy of eye tracking is not high. For example, a direction in which the user rotates the head or rotates the eyeball has some deviation from an actual direction. In addition, a calculation method provided by the device has an error. Human errors and system errors cause low accuracy of an existing eye tracking interaction manner, and the user has a poor interaction experience.

In particular, when interacting with a two-dimensional (2D) window in an extended reality space, the 2D window may include a plurality of components such as a plurality of controls and sub-windows. The plurality of components have a hierarchical structure and are close to each other, which increases difficulty in selecting the components in the 2D window, and it is difficult for the device to determine and reproduce the real interaction intention of the user.

SUMMARY

Embodiments of this application provide an eye tracking method and apparatus, device, medium, and program. A collision detection area is determined based on a sight start point, a sight direction, and a fixation point of a user. A plurality of candidate components that the user may interact with are determined in a 2D interactive panel by using the collision detection area, and then an interactive component that the user is most likely to interact with is determined from the plurality of candidate virtual components, thereby improving accuracy of eye tracking on the 2D interactive panel.

According to a first aspect, an embodiment of this application provides an eye tracking method. The method includes:

obtaining a sight start point, a sight direction, a fixation point of a sight on a two-dimensional (2D) interactive panel in an extended reality space of a user, and a size parameter of a collision detection area on the interactive panel, where the collision detection area is a 2D graphic;

determining a position of the collision detection area based on a position of the fixation point and the size parameter of the collision detection area;

determining an interactive candidate component collided with the collision detection area based on the position of the collision detection area and positions of interactive components on the interactive panel;

when there are a plurality of candidate components in the interactive panel, determining one interactive component from the plurality of candidate components based on a position relationship between the plurality of candidate components and the sight start point, the sight direction.

In an optional implementation, the determining an interactive candidate component collided with the collision detection area based on the position of the collision detection area and positions of interactive components on the interactive panel includes:

determining a plurality of sampling points in the collision detection area according to a preset sampling manner;

determining, based on positions of the sampling points and the positions of the interactive components, an interactive component that contains the sampling points as the candidate component.

In an optional implementation, the size parameter of the collision detection area is a radius of a sphere;

the determining a position of the collision detection area based on a position of the fixation point and the size parameter of the collision detection area includes:

determining a circular or elliptical collision detection area based on the radius of the sphere and using the position of the fixation point as a center point.

In an optional implementation, the collision detection area is a square or rectangular area;

the determining an interactive candidate component collided with the collision detection area based on the position of the collision detection area and positions of interactive components on the interactive panel includes:

determining, based on the position of the square or rectangular collision detection area and the positions of the interactive components, whether the interactive components collide with the square or rectangular collision detection area;

when the interactive components collide with the square or rectangular collision detection area, determining that the interactive components are the candidate components.

In an optional implementation, the size parameter of the collision detection area is a radius of a sphere;

the determining a position of the collision detection area based on a position of the fixation point and the size parameter of the collision detection area comprises:

determining a length of a major axis of an ellipse or a diameter of a circle formed when the sphere is projected onto the interactive panel based on the radius of the sphere and an included angle between the sight direction and the interactive panel;

determining the square or rectangular collision detection area based on the length of the major axis of the ellipse or the diameter of the circle and using the position of the fixation point as a center point.

In an optional implementation, before the when there are a plurality of candidate components in the interactive panel, determining one interactive component from the plurality of candidate components based on a position relationship between the plurality of candidate components and the sight start point, the sight direction, the method further comprises:

filtering the plurality of candidate components based on a hierarchical relationship between components in the interactive panel.

In an optional implementation, the filtering the plurality of candidate components based on a hierarchical relationship between components in the interactive panel comprises:

when it is determined, based on the hierarchical relationship between the components in the interactive panel, that the hierarchical relationship between the plurality of candidate components is a nesting relationship, filtering out a candidate component located at a bottom layer.

In an optional implementation, the determining one interactive component from the plurality of candidate components based on a position relationship between the plurality of candidate components and the sight start point, the sight direction comprises:

determining collision points of the plurality of candidate components, wherein the collision points are points on the candidate components that are closest to the sight direction;

determining an interactive score of each candidate component based on a position relationship between the collision point of the candidate component and the sight start point, the sight direction, and a center point of the candidate component;

determining the interactive component from the plurality of candidate components based on the interactive score of each candidate component.

In an optional implementation, the determining collision points of the plurality of candidate components comprises:

traversing the plurality of candidate components, and when the fixation point is located in a current candidate component, determining the fixation point as a collision point of the current candidate component;

when the fixation point is located outside the current candidate component, determining a first point in the current candidate component that is closest to the sight direction;

determining the first point as the collision point of the current candidate component.

In an optional implementation, the determining the first point as the collision point of the current candidate component comprises:

if a distance between the sight direction and the first point is less than or equal to a first distance threshold, determining the first point as the collision point of the current candidate component, wherein the first distance threshold is determined based on the size of the collision detection area;

if the distance between the sight direction and the first point is greater than the first distance threshold, filtering out the current candidate component.

In an optional implementation, the determining a first point in the current candidate component that is closest to the sight direction comprises:

when the current candidate component is blocked by a first candidate component, determining a boundary of an unblocked part of the current candidate component based on a position of the first candidate component;

determining a first point in the unblocked part of the current candidate component that is closest to the sight direction.

In an optional implementation, the determining an interactive score of each candidate component based on a position relationship between the collision point of the candidate components and the sight start point, the sight direction, and a center point of the candidate component comprises:

calculating a first distance between the collision point of each candidate component and the sight start point based on the position of the sight start point and the position of the collision point of the candidate component;

determining a collision direction of each candidate component using the sight start point as a start point and the collision point of the candidate component as an end point, and determining a first included angle between the collision direction of each candidate component and the sight direction;

calculating a second distance between the collision point and the center point of each candidate component based on the position of the collision point and the position of the center point of the candidate component;

determining a center direction of each candidate component using the sight start point as a start point and the center point of the candidate component as an end point, and determining a second included angle between the center direction of each candidate component and the sight direction;

performing a weighted operation on the first distance, the first included angle, the second distance, and the second included angle of each candidate component to obtain the interactive score of each candidate component.

In an optional implementation, before the obtaining a sight start point, a sight direction, a fixation point of a sight on a two-dimensional (2D) interactive panel in an extended reality space of a user, and a size parameter of a collision detection area on the interactive panel, the method further comprises:

selecting the interactive panel based on an eye movement parameter.

In an optional implementation, after the determining a position of the collision detection area based on a position of the fixation point and the size parameter of the collision detection area, the method further comprises:

displaying the collision detection area based on the position of the collision detection area.

In an optional implementation, the collision detection area is suspended on the interactive panel, and the collision detection area is translucent.

According to a second aspect, an embodiment of this application provides an eye tracking apparatus. The apparatus includes:

an obtaining module, configured to obtain a sight start point, a sight direction, a fixation point of a sight on a two-dimensional (2D) interactive panel in an extended reality space of a user, and a size parameter of a collision detection area on the interactive panel, wherein the collision detection area is a 2D graphic;

a determining module, configured to determine a position of the collision detection area based on a position of the fixation point and the size parameter of the collision detection area;

a collision detection module, configured to determine an interactive candidate component collided with the collision detection area based on the position of the collision detection area and positions of interactive components on the interactive panel;

a selection module, configured to: when there are a plurality of candidate components in the interactive panel, determine one interactive component from the plurality of candidate components based on a position relationship between the plurality of candidate components and the sight start point, the sight direction.

According to a third aspect, an embodiment of this application provides an XR device. The XR device includes: a processor and a memory, where the memory is configured to store a computer program, and the processor is configured to call and run the computer program stored in the memory to perform the method according to the first aspect.

According to a fourth aspect, an embodiment of this application provides a computer-readable storage medium. The computer-readable storage medium is configured to store a computer program, where the computer program enables a computer to perform the method according to the first aspect.

According to a fifth aspect, an embodiment of this application provides a computer program product including a computer program, where when the computer program is executed by a processor, the method according to the first aspect is implemented.

The eye tracking method and apparatus, the device, the medium, and the program provided in the embodiments of this application. The method includes: obtaining a sight start point, a sight direction, a fixation point of a sight on a two-dimensional (2D) interactive panel of a user, and a size parameter of a collision detection area, where the collision detection area is a 2D graphic; determining a position of the collision detection area based on a position of the fixation point and the size parameter of the collision detection area; determining an interactive candidate component collided with the collision detection area based on the position of the collision detection area and positions of interactive components on the interactive panel; when there are a plurality of candidate components in the interactive panel, determining one interactive component from the plurality of candidate components based on a position relationship between the plurality of candidate components and the sight start point, the sight direction. According to the method, a collision detection area is determined based on the sight start point, the sight direction, and the fixation point of the user. A plurality of candidate components that the user may interact with are determined in the 2D interactive panel by using the collision detection area, and then a component that the user is most likely to interact with is determined from the plurality of candidate components.

BRIEF DESCRIPTION OF THE DRAWINGS

In order to more clearly describe the technical solutions in the embodiments of the present disclosure, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 1 is a flowchart of an eye tracking method according to Embodiment 1 of this application;

FIG. 2 is a schematic diagram of a front view and a top view of a three-dimensional (3D) virtual object and a 2D interactive panel in an extended reality space;

FIG. 7 is a flowchart of an eye tracking method according to Embodiment 2 of this application;

FIG. 8 is a schematic diagram of two position relationships between a fixation point and a candidate component;

FIG. 15 is a flowchart of an eye tracking method according to Embodiment 3 of this application;

DETAILED DESCRIPTION OF EMBODIMENTS

Figure 3:
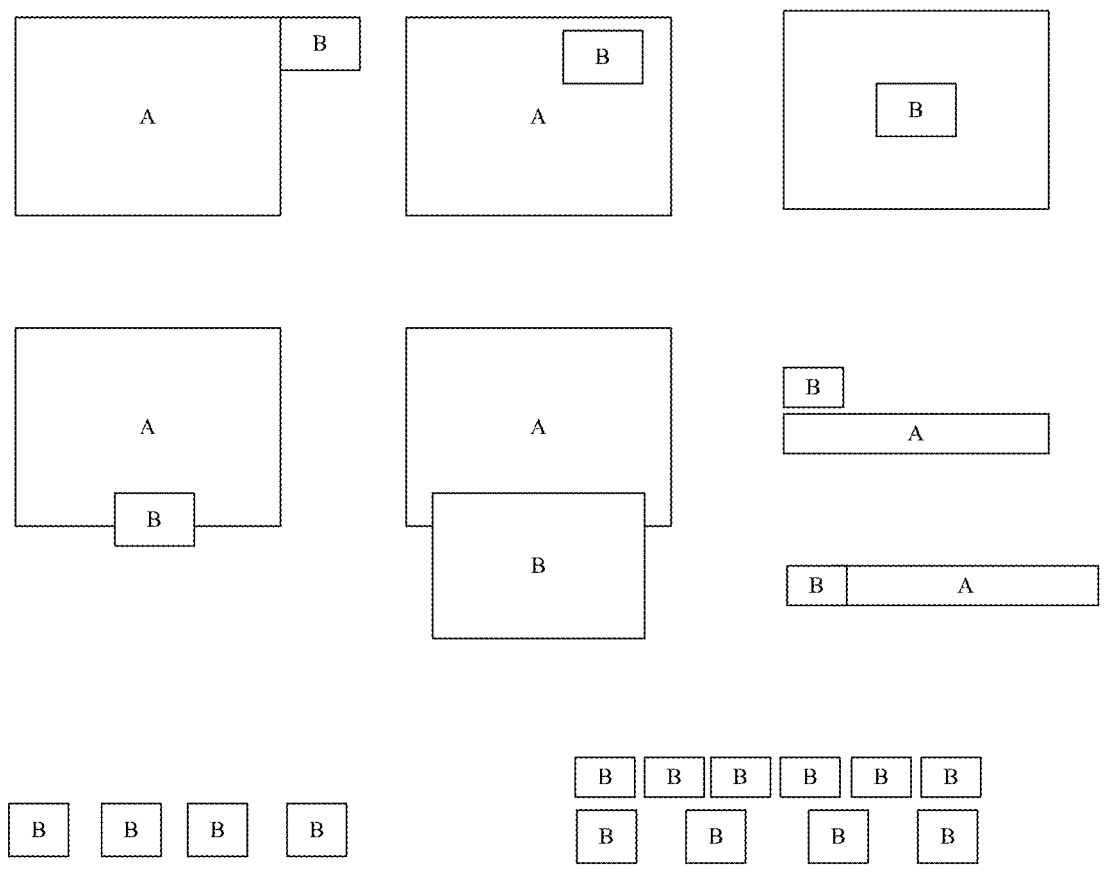
FIG. 3 is a schematic diagram of some possible forms of the 2D interactive panel.

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

It should be noted that the terms "first", "second", and the like in the specification, claims, and accompanying drawings of the present disclosure are intended to distinguish between similar objects but do not necessarily indicate a specific order or sequence. It should be understood that the data termed in such a way are interchangeable in proper circumstances so that the embodiments of the present disclosure described herein can be implemented in orders except the order illustrated or described herein. In addition, the terms "include", "have", or any other variant thereof are intended to cover a non-exclusive inclusion. For example, a process, method, system, product, or server that includes a list of steps or units is not necessarily limited to those explicitly listed steps or units, but may include other steps or units not explicitly listed or inherent to such process, method, product, or device.

To facilitate understanding of the embodiments of this application, some concepts involved in all embodiments of this application are appropriately explained before the embodiments of this application are described. The specific explanations are as follows:

The eye tracking method provided in embodiments of this application may be applied to an XR device. The XR device includes but is not limited to a VR device, an AR device, and an MR device.

VR: A technology for creating and experiencing a virtual world. A virtual environment is generated through computing. The virtual environment is a multi-source information environment (virtual reality mentioned in this application includes at least visual perception. In addition, the virtual reality may further include auditory perception, tactile perception, motion perception, and even gustatory perception, olfactory perception, and the like.). The VR technology implements fusion of the virtual environment and simulation of interactive three-dimensional dynamic scenes and entity behaviors, enables a user to be immersed in a simulated virtual reality environment, and enables applications in various virtual environments such as mapping, gaming, video, education, medical treatment, simulation, collaborative training, sales, manufacturing assistance, maintenance, and repair.

A VR device refers to a terminal for implementing a virtual reality effect, and is usually provided in a form of glasses, a head-mounted display (Head Mount Display, HMD), or contact lenses, to implement visual perception and other forms of perception. Certainly, a form implemented by the virtual reality device is not limited thereto, and may be further miniaturized or enlarged based on requirements.

AR: An AR setting refers to a simulated setting in which at least one virtual object is superimposed on a physical setting or a representation thereof. For example, an electronic system may have an opaque display and at least one imaging sensor for capturing images or videos of the physical setting, which images or videos are representations of the physical setting. The system combines the images or videos with the virtual object, and displays the combination on the opaque display. An individual uses the system to view the physical setting indirectly via the images or videos of the physical setting, and observes the virtual object superimposed on the physical setting. When the system uses one or more image sensors to capture images of the physical setting, and presents an AR setting on the opaque display using those images, the displayed images are referred to as video pass-through. Alternatively, an electronic system for displaying an AR setting may have a transparent or semi-transparent display through which an individual can view the physical setting directly. The system may display virtual objects on the transparent or semi-transparent display, so that an individual uses the system to observe the virtual objects superimposed on the physical setting. For another example, the system may include a projection system that projects virtual objects into the physical setting. The virtual objects may be projected, for example, on a physical surface or as a holograph, so that an individual uses the system to observe the virtual objects superimposed on the physical setting. Specifically, a technology of adding virtual elements to an image collected by a camera based on a camera pose parameter calculated in real time during an image collection process of the camera. The virtual elements include but are not limited to images, videos, and three-dimensional models. The target of the AR technology is to superimpose the virtual world on the real world for interaction on a screen.

MR: Virtual scene information is presented in a real scene, to establish an information loop for interaction and feedback among the real world, the virtual world, and a user, thereby enhancing the reality of a user experience. For example, sensory inputs (for example, virtual objects) created by a computer are integrated into a simulated setting with sensory inputs from a physical setting or representations thereof. In some MR settings, the computer-created sensory inputs can be adapted to changes in the sensory inputs from the physical setting. In addition, some electronic systems for presenting MR settings may monitor an orientation and/or a position relative to the physical setting, so that the virtual objects can interact with real objects (that is, physical elements from the physical setting or representations thereof). For example, the system can monitor motion, so that a virtual plant appears to be stationary relative to a physical building.

A virtual reality device (VR device) is a terminal for implementing a virtual reality effect, and is usually provided in a form of glasses, a head-mounted display (Head Mount Display, HMD), or contact lenses, to implement visual perception and other forms of perception. Certainly, a form implemented by the virtual reality device is not limited thereto, and may be further miniaturized or enlarged based on requirements.

Optionally, the virtual reality device (that is, an XR device) described in the embodiments of this application may include but is not limited to the following several types:

1) A mobile virtual reality device that supports a mobile terminal (such as a smart phone) to be arranged in various manners (for example, a head-mounted display provided with a dedicated card slot), is connected to the mobile terminal through a wired or wireless manner, and performs related calculations of a virtual reality function through the mobile terminal, and outputs data to the mobile virtual reality device, for example, viewing a virtual reality video through an APP of the mobile terminal.

2) An all-in-one virtual reality device has a processor for performing related calculations of a virtual function, and therefore has an independent virtual reality input and output function. The all-in-one virtual reality device does not need to be connected to a PC terminal or a mobile terminal, and has high freedom of use.

3) A computer-side virtual reality (PCVR) device uses a PC terminal to perform related calculations of a virtual reality function and output data. An externally connected computer-side virtual reality device uses data output by the PC terminal to implement a virtual reality effect.

The following describes the eye tracking method provided in this embodiment of this application in detail with reference to the accompanying drawings and some embodiments and application scenarios thereof. The following embodiments may be combined with each other, and for the same or similar concepts or processes, some embodiments may not be described again.

FIG. 1 is a flowchart of an eye tracking method according to Embodiment 1 of this application. The method is applied to an XR device, and is specifically applied to an eye move interactor in the XR device. The eye move interactor refers to a device for controlling eye movement interaction, and the device may consist of software and/or hardware. As shown in FIG. 1, the method provided in this embodiment includes the following steps.

S101: Obtain a sight start point, a sight direction, a fixation point of a sight on a two-dimensional (2D) interactive panel in an extended reality space of a user, and a size parameter of a collision detection area on the interactive panel, where the collision detection area is a 2D graphic.

The XR device detects an eye movement parameter of the user. The eye movement parameter of the user includes the sight direction and the sight start point. The sight start point is also referred to as a sight origin or a fixation start point, and is used to describe a start position of the sight of the user. The sight start point may be a point on an eye of the user, or may be a point on the XR device that is directly opposite to the eye. The sight direction is also referred to as a fixation direction, and is used to describe a direction of the sight of the user.

A virtual object (or referred to as an object) displayed in the extended reality space includes a virtual object that can be interacted with by the user, for example, a three-dimensional (3D) control, a 2D interactive panel, a 3D game prop, a 3D decoration, or the like. In addition, the virtual object may include some fixed virtual objects that cannot be interacted with by the user, for example, background objects or environmental objects in the extended reality space, for example, a house, a building, or a plant.

The interactive virtual objects in the extended reality space include interactive 2D virtual objects and 3D virtual objects. The 2D virtual object may be a 2D interactive panel, and the 2D interactive panel is also referred to as a 2D window or a 2D user interface (UI).

FIG. 2 is a schematic diagram of a front view and a top view of a three-dimensional (3D) virtual object and a 2D interactive panel in an extended reality space. As shown in FIG. 2, the extended reality space includes one 3D object and one 2D UI.

Components of the 2D interactive panel may include a plurality of controls and sub-windows. FIG. 3 is a schematic diagram of some possible forms of the 2D interactive panel. A component on the 2D interactive panel is also referred to as a window or a view of the 2D interactive panel.

When the user interacts with the 2D interactive panel, the user may interact with the entire 2D interactive panel, for example, hover over the 2D interactive panel and move or scale the 2D interactive panel. Alternatively, the user may interact with a specific sub-window or a specific control in the 2D interactive panel, for example, click on the specific sub-window or the specific control in the 2D interactive panel.

When the user interacts with the sub-window or the control in the 2D interactive panel by an eye movement, the 2D interactive panel is first selected based on the eye movement parameter, and then a component of the 2D interactive panel that the user may interact with is determined by using the method in this embodiment based on the eye movement parameter.

The fixation point of the sight on the 2D interactive panel is an intersection point of the sight and the 2D interactive panel, and the position of the fixation point is determined based on the sight start point and the sight direction.

The collision detection area is used to assist in detecting a component on the 2D interactive panel that the user may interact with. In this embodiment, the collision detection area is a 2D graphic or a planar image with a specific area, that is, the collision detection area is a planar area and is located on the 2D interactive panel.

S102: Determine a position of the collision detection area based on a position of the fixation point and the size parameter of the collision detection area.

A specific shape of the collision detection area is not limited in this embodiment. The collision detection area may be a regular planar graphic such as a circle, an ellipse, a rectangle, or a square. Alternatively, the collision detection area may be an irregular planar graphic.

The size parameter of the collision detection area is used to determine a shape and a size of the collision detection area. Different-shaped collision detection areas have different size parameters. The size parameter of the collision detection area may be a preset fixed parameter, or may be determined in real time based on an application type, hardware parameters of the XR device, or environment information where the XR device is currently located.

For example, when the collision detection area is a circle, the size parameter of the collision detection area may be a radius or a diameter of the circle.

When the collision detection area is an ellipse, the size parameter of the collision detection area may be a length of a major axis and/or a length of a minor axis of the ellipse. Optionally, the size parameter of the collision detection area may be a radius or a diameter of the circle. A length of the major axis of the ellipse may be calculated based on the radius or the diameter of the circle. A length of the minor axis of the ellipse is determined based on the length of the major axis of the ellipse or the radius of the circle.

When the collision detection area is a square, the size parameter of the collision detection area may be a side length of the square.

When the collision detection area is a rectangle, the size parameter of the collision detection area may be a length and a width of the rectangle.

For example, the position of the collision detection area is determined based on the size parameter of the collision detection area and using the position of the fixation point as a center point.

S103: Determine an interactive candidate component collided with the collision detection area based on the position of the collision detection area and positions of interactive components on the interactive panel.

The interactive candidate component collided with the collision detection area is a component that overlaps or contacts the collision detection area, and this candidate component is a component that the user may interact with.

A collision detection area is designated on the interactive panel, and a component that the user may interact with is determined based on the position of the collision detection area, so that the component that the user may interact with can be determined efficiently and quickly. For example, the candidate component is determined in the following two manners:

Manner 1: Determine a plurality of sampling points in the collision detection area according to a preset sampling manner, and determine an interactive component that contains the sampling point as the candidate component based on positions of the sampling points and the positions of the interactive components.

This manner simulates a detection manner of a touch event. Each sampling point may be considered as one touch point. Whether a sampling point falls within a position area of each component of the 2D interactive panel is determined in sequence based on the position of each sampling point. When the sampling point falls within the position area of a specific component of the 2D interactive panel, the component is determined as the candidate component. Whether the sampling point falls within the component of the 2D interactive panel may be interpreted in turn as whether the position area of the 2D interactive panel contains the sampling point. The determination is performed for each sampling point in sequence to obtain the candidate component (s).

The sampling manner includes a sampling interval, and the sampling interval is a distance between two sampling points. Optionally, the sampling manner further includes a maximum number of samplings, or the sampling manner further includes a sampling pattern, for example, sampling is performed according to a circular sampling image.

Figure 4:
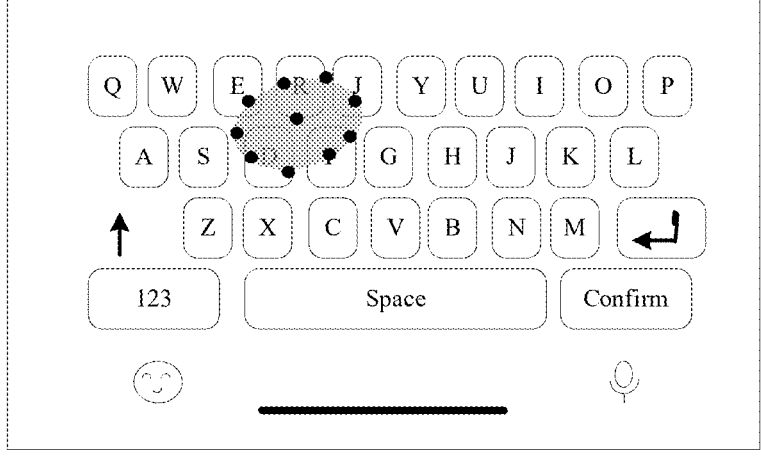
FIG. 4 is a schematic diagram of sampling points of a collision detection area.

FIG. 4 is a schematic diagram of sampling points of a collision detection area. As shown in FIG. 4, the 2D interactive panel is a virtual keyboard, each key on the virtual keyboard is an interactive component, the collision detection area is an ellipse, a center point of the collision detection area is the fixation point, and a circle around the collision detection area is the sampling points. By using the manner 1, it may be learned that the candidate component on the 2D interactive panel is keys E, R, T, D, and E.

Figure 5:
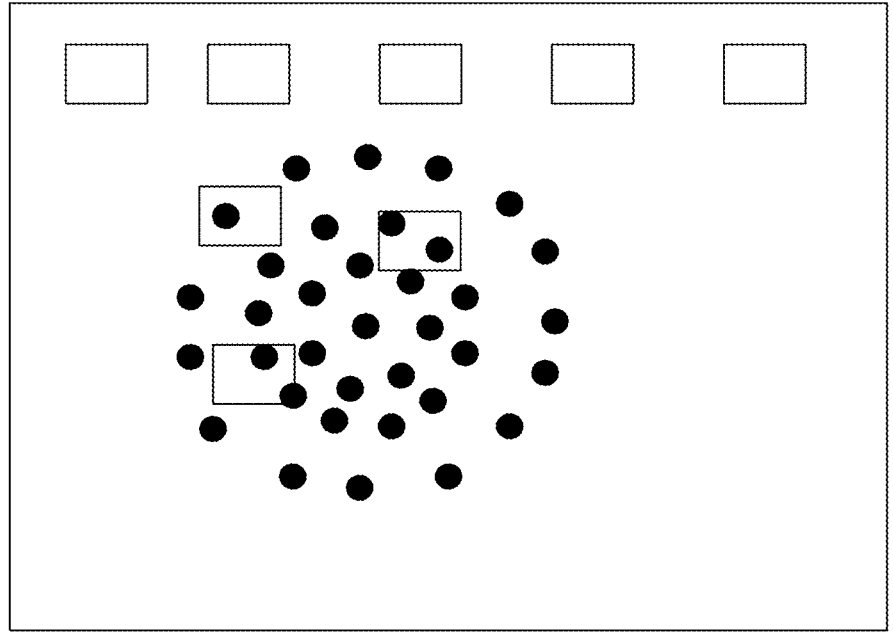
FIG. 5 is another schematic diagram of the sampling points of the collision detection area.

FIG. 5 is another schematic diagram of the sampling points of the collision detection area. As shown in FIG. 5, the collision detection area is a circle, and a plurality of circles of sampling points are obtained in the circular collision detection area in sequence according to preset sampling radii.

Manner 2: The collision detection area is a square or rectangular area. Whether the interactive components collide with the square or rectangular collision detection area is determined based on the position of the square or rectangular collision detection area and the positions of the interactive components. When the interactive components collide with the square or rectangular collision detection area, it is determined that the interactive components are the candidate components.

In this manner, the candidate component may be determined through collision detection. Whether the collision detection area overlaps or collides with the interactive component may be determined based on a coordinate comparison result obtained by comparing coordinates of each of the vertexes and coordinates of the points on each side of the collision detection area and that of a bounding volume of the interactive component.

The bounding volume is also referred to as a bounding box, a shield, a protection box, or a safety zone. The bounding volume may be considered as a transparent object that covers or surrounds the entire interactive component, and is used to assist in detecting whether a collision occurs to the interactive component. The bounding volume is invisible to the user. To reduce complexity of collision detection, the bounding volume is usually a rectangle or a square. A shape of the bounding volume is not limited in this embodiment.

In this manner, the candidate component can be determined through simple coordinate comparison, and the calculation amount and complexity of determining the candidate component can be reduced compared with the Manner 1.

Figure 6:
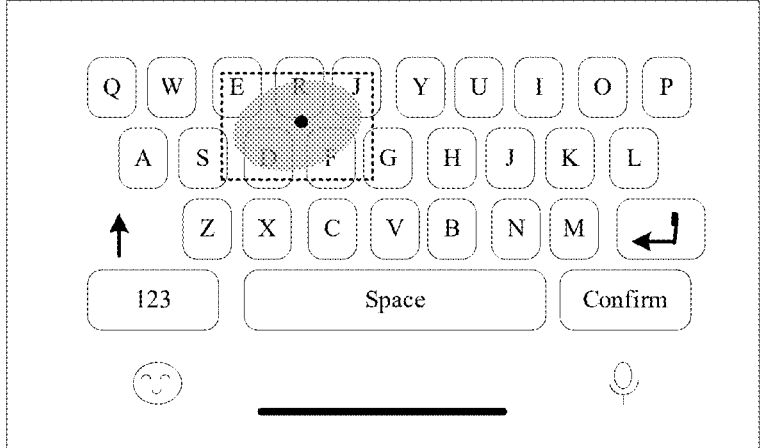
FIG. 6 is a schematic diagram of the collision detection area.

FIG. 6 is a schematic diagram of the collision detection area. As shown in FIG. 6, the 2D interactive panel is a virtual keyboard, each key on the virtual keyboard is an interactive component, the collision detection area is a square shown by a dotted line, and a center point of the collision detection area is the fixation point. By using the Manner 2, it may be learned that the candidate components on the 2D interactive panel are keys E, R, T, D, and E.

The collision detection area may be understood as a projection of the sight of the user on the 2D interactive panel. Optionally, in this embodiment, the sight of the user is modeled as a sphere, and the collision detection area may be understood as a projection of the sphere on the 2D interactive panel.

It may be understood that a result of intersection of the sphere and a plane may be a circle or an ellipse. Specifically, when the sight direction is perpendicular to the 2D interactive panel, the result of intersection of the sphere and the plane may be a circle. When the sight direction is not perpendicular to the 2D interactive panel, the result of intersection of the sphere and the plane may be an ellipse. Accordingly, the shape of the collision detection area is a circle or an ellipse, and the size parameter of the collision detection area is the radius of the sphere.

In an implementation, a circular or elliptical collision detection area is determined based on the radius of the sphere and using the position of the fixation point as a center point.

For example, a length of a major axis of an ellipse or a diameter of a circle formed when the sphere is projected onto the 2D interactive panel is determined based on the radius of the sphere and an included angle between the sight direction and the interactive panel. Optionally, the length b of the major axis of the ellipse or the diameter of the circle is determined by using the following formula (1):

$$b = \frac{2r}{\sin a} \qquad (1)$$

where r represents the radius of the sphere, a represents the included angle between the sight direction and the interactive panel, where when a is 90 degrees, the projection of the sphere is a circle, b is the diameter of the circle, and when a is less than 90 degrees, the projection of the sphere is an ellipse, and b is the length of the major axis of the ellipse.

When the projection of the sphere is a circle, a circular collision detection area with a diameter of b is formed, and a radius of the circular collision detection area is equal to the radius of the sphere.

When the projection of the sphere is an ellipse, a circular collision detection area with a diameter of b may be formed, and a radius of the circular collision detection area is greater than the radius of the sphere; or an ellipse with a major axis length of b is formed.

A length of a minor axis of the ellipse is less than the length b of the major axis of the ellipse. For example, it is determined that the length of the minor axis of the ellipse is equal to 2r, or the length of the minor axis of the ellipse is determined based on a preset ratio of the major axis to the minor axis of the ellipse. Certainly, the length of the minor axis of the ellipse may be calculated in another manner, which is not limited in this embodiment.

In another implementation, the length of the major axis of the ellipse or the diameter of the circle formed when the sphere is projected onto the interactive panel is determined based on the radius of the sphere and the included angle between the sight direction and the interactive panel, and the square or rectangular collision detection area is determined based on the length of the major axis of the ellipse or the diameter of the circle and using the position of the fixation point as a center point.

For example, the length b of the major axis of the ellipse or the diameter of the circle is determined by using the above formula (1).

When the projection of the sphere is a circle, a square collision detection area with a side length of b is formed, and the side length of the square collision detection area is equal to the diameter of the sphere.

When the projection of the sphere is an ellipse, a square collision detection area with a side length of b may be formed. The side length of the square collision detection area is greater than the diameter of the sphere, or a rectangular collision detection area with a length of b is formed.

A width of the rectangular collision detection area is less than the length b. For example, it is determined that the width of the rectangle is equal to 2r, or the width of the rectangle is determined based on a preset ratio of the length to the width of the rectangle. Certainly, the width of the rectangle may be calculated in another manner, which is not limited in this embodiment.

The latter implementation may also be considered as setting a rectangular or square detection frame around the circular or elliptical projection.

S104: When there are a plurality of candidate components in the interactive panel, determine one interactive component from the plurality of candidate components based on a position relationship between the plurality of candidate components and the sight start point, the sight direction.

The number of candidate components collided with the collision detection area may be one or more. When a plurality of candidate components are collided with the collision detection area, it is necessary to determine a component that the user intends to interact with from the plurality of candidate components. The component that the user intends to interact with refers to a component that the user is most likely to interact with.

A plurality of components that the user may interact with can be determined by using one collision detection area with a specific area. The XR device selects one component that the user is most likely to interact with based on position relationships between each of the candidate components and the sight start point, the sight direction, so that accuracy of eye tracking can be improved.

In an example manner, collision points of the plurality of candidate components are determined, where the collision point of the candidate component is a point on the candidate component that is closest to the sight direction. An interactive score of each candidate component is determined based on position relationships between the collision point of the candidate components and the sight start point, the sight direction, and center point of the candidate component. The interactive component is determined from the plurality of candidate components based on the interactive score of each candidate components.

When there is one candidate component collided with the collision detection area, the virtual component may be determined as the interactive component. Alternatively, whether the candidate component is the interactive component is determined based on the position relationship between the candidate component and the sight start point, the sight direction. For example, a collision point between the collision detection area and the candidate component is determined based on a position of the candidate component and the position of the collision detection area. An interactive score of the candidate component is determined based on a position relationship between a collision point of the candidate component and the sight start point, the sight direction, and a center point of the candidate component. If the interactive score of the candidate component is greater than a specific threshold, the candidate component is determined as the interactive component. If the interactive score of the candidate component is less than the threshold, the candidate component is determined as not being the interactive component.

The interactive component is a component selected by the user for interaction. After the interactive component is determined, a collision point of the interactive component may be used as an event trigger position, and a corresponding operation is triggered based on the event trigger position. For example, the interactive component is selected, clicked, double-clicked, moved, hovered, or controlled to generate a preset special effect.

In this embodiment, a sight start point, a sight direction, a fixation point of a sight on a 2D interactive panel of a user, and a size parameter of a collision detection area are obtained, where the collision detection area is a 2D graphic; a position of the collision detection area is determined based on a position of the fixation point and the size parameter of the collision detection area; an interactive candidate component collided with the collision detection area is determined based on the position of the collision detection area and positions of interactive components on the interactive panel; and when there are a plurality of candidate components in the interactive panel, one interactive component is determined from the plurality of candidate components based on a position relationship between the plurality of candidate components and the sight start point, the sight direction. According to the method, a collision detection area is determined based on the sight start point, the sight direction, and the fixation point of the user. A plurality of candidate components that the user may interact with are determined in the 2D interactive panel by using the collision detection area, and then a component that the user is most likely to interact with is determined from the plurality of candidate components, thereby improving accuracy of eye tracking on the 2D interactive panel.

Based on Embodiment 1, Embodiment 2 of this application provides an eye tracking method, which is used to describe in detail step S104 in Embodiment 1. FIG. 7 is a flowchart of the eye tracking method according to Embodiment 2 of this application. As shown in FIG. 7, the method provided in this embodiment includes the following steps.

S1041: Determine collision points of the plurality of candidate components, where the collision points are points on the candidate components that are closest to the sight direction.

For example, the collision points of the plurality of candidate components are determined in the following manner:

traverse the plurality of candidate components, and when the fixation point is located in a current candidate component, determine the fixation point as a collision point of the current candidate component.

When the fixation point is located outside the current candidate component, determine a first point in the current candidate component that is closest to the sight direction; and determine the first point as the collision point of the current candidate component.

FIG. 8 is a schematic diagram of two position relationships between a fixation point and a candidate component. As shown in FIG. 8, in a left diagram, the fixation point is located in a candidate component. It can be learned from the diagram that the fixation point is a point that is closest to the sight direction. Therefore, the fixation point is used as the collision point of the candidate component.

In a right diagram of FIG. 8, the fixation point is located outside the candidate component. Therefore, a point in the candidate component that is closest to the sight direction needs to be determined based on the sight direction and the position of the candidate component.

Figure 9:
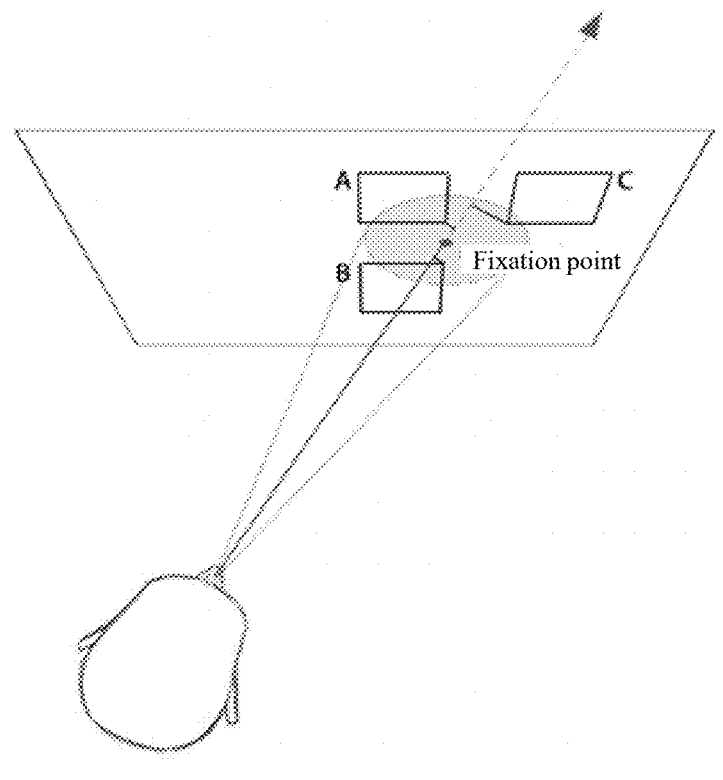
FIG. 9 is a schematic diagram of a distance between a first point closest to a sight direction on a candidate component and the sight direction.

FIG. 9 is a schematic diagram of a distance between a first point closest to a sight direction on a candidate component and the sight direction. As shown in FIG. 9, the 2D interactive panel includes three candidate components: A, B, and C. The fixation point is located outside the three candidate components. Therefore, a point in each of the three candidate components that is closest to the sight direction needs to be calculated. Specifically, a distance between a point on each side of each candidate component and the sight direction needs to be calculated, and then distances between each of the points and the sight direction are compared. A point with a minimum distance is selected as the first point in the candidate component that is closest to the sight direction.

In FIG. 9, outer borders of each of the candidate components are rectangles. In an actual scenario, the outer borders of each of the candidate components are not necessarily rectangles. To reduce calculation complexity, a rectangular bounding volume may be set for each of the candidate components, and a point in the rectangular bounding volume of the candidate component that is closest to the sight direction is determined as the first point.

It should be noted that when the distance between the point on each side of each candidate component and the sight direction is calculated, the calculation is performed in a three-dimensional (3D) space instead of a plane in which the 2D interactive panel is located. In FIG. 9, the dotted line is an extension of the sight direction. Connecting lines (that is, distances) between the first points of the candidate components B and C and the ray direction are located in the 3D space instead of the plane in which the 2D interactive panel is located.

It may be understood that in the example shown in FIG. 9, the fixation point is located outside all the candidate components. In an actual scenario, the fixation point may be located in some candidate components.

There may be an occlusion relationship between the plurality of candidate components. When there is an occlusion relationship between the candidate components, the first point in the candidate component that is closest to the sight direction may be determined based on a visible part of the user.

For example, when a current candidate component is blocked by a first candidate component, a boundary of an unblocked part of the current candidate component is determined based on a position of the first candidate component, and then the first point in the unblocked part of the current candidate component that is closest to the sight direction is determined. A boundary around the unblocked part forms the unblocked part that is visible to the user.

Figure 10:
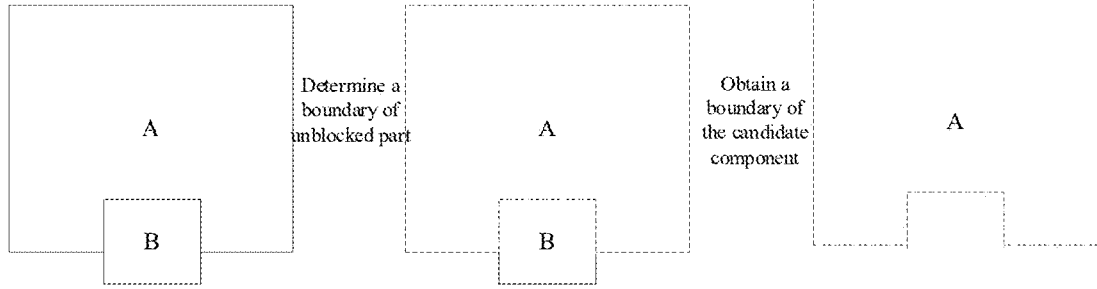
FIG. 10 is a schematic diagram of a process of determining a boundary of an unblocked part of a candidate component.

FIG. 10 is a schematic diagram of a process of determining a boundary of an unblocked part of a candidate component. As shown in FIG. 10, the candidate component B blocks the candidate component A. When the first point in the candidate component A that is closest to the sight direction is calculated, a boundary of an unblocked part of the candidate component B is first calculated based on a position of the candidate component B, and then the first point in the unblocked part of the candidate component B that is closest to the sight direction is determined based on the boundary of the unblocked part of the current candidate component.

The sight of the user is aimed only at components or areas that the user can see. The point in the candidate component that is closest to the sight direction is determined based on the visible part of the user as the collision point, so that the determined collision point is more accurate, thereby improving accuracy of a subsequent selection result.

Optionally, the candidate components may be filtered based on a distance between the first point in the candidate component and the sight direction, and candidate components with a low possibility of interaction with the user are filtered out. For example, it is determined whether a distance between the first point in the current candidate component and the sight direction is less than or equal to a first distance threshold, where the first distance threshold is determined based on a size of the collision detection area. If the distance between the sight direction and the first point is less than or equal to the first distance threshold, the first point is determined as the collision point of the current candidate component. If the distance between the sight direction and the first point is greater than the first distance threshold, the current candidate component is filtered out.

The first distance threshold is determined based on the size of the collision detection area, so that the retained candidate components are component visible to the user. Subsequent processing is performed based on the collision points of the components visible to the user, which can not only reduce calculation energy consumption required for calculating interactive scores of the candidate components subsequently, but also improve accuracy of determining an interaction intention of the user.

Optionally, the size of the collision detection area may be determined as the first distance threshold. For example, the radius of the sphere is determined as the first distance threshold, or ½ of a major axis distance of the ellipse obtained through projection of the sphere is determined as the first distance threshold, or ½ of the length or the width of the rectangle is determined as the first distance threshold, or ½ of the side length of the square is determined as the first distance threshold.

In an example where the first distance threshold is the radius of the sphere, if the distance between the sight direction and the first point is less than or equal to the radius of the sphere, the first point is determined as the collision point of the current candidate component. If the distance between the sight direction and the first point is greater than the radius of the sphere, the current candidate component is filtered out.

S1042: Determine an interactive score of each candidate component based on a position relationship between the collision point of the candidate component and the sight start point, the sight direction, and a center point of the candidate component.

The position relationship between the collision point of the candidate component and the sight start point, the sight direction, and the center point of the candidate component may be represented by a distance and an included angle.

For example, a first distance, a first included angle, a second distance, and a second included angle of each candidate component are calculated in the following manners respectively, and weighted operation is performed based on the first distance, the first included angle, the second distance, and the second included angle of each candidate component to obtain the interactive score of each candidate component.

(1) First Distance

The first distance is used to represent a distance between the collision point of the candidate component and the sight start point. The first distance between the collision point of each candidate component and the sight start point is calculated based on the position of the sight start point and the position of the collision point of each candidate component.

A smaller first distance indicates that the user is closer to the candidate component. Generally, the closer the component is to the user, the greater the possibility that the component is a component that the user actually wants to interact with.

Figure 11:
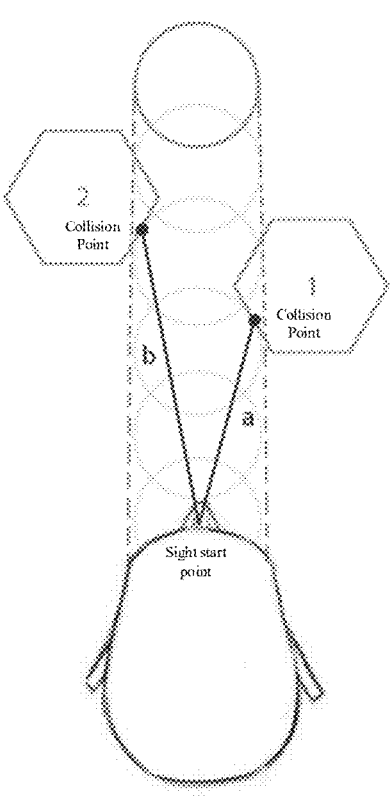
FIG. 11 is a schematic diagram of a first distance between a collision point of a candidate component and a sight start point.

FIG. 11 is a schematic diagram of a first distance between a collision point of a candidate component and a sight start point. As shown in FIG. 11, a collision detector is cylindrical, and the collision detector collides with a component 1 and a component 2 in an extended reality space. A first distance between the collision point of the component 1 and the sight start point is a, a first distance between the collision point of the component 2 and the sight start point is b, and a is less than b. Therefore, the component 1 is more likely to be a component that the user actually wants to interact with.

(2) First Included Angle

The first included angle is an included angle between a collision direction of the candidate component and the sight direction. The collision direction of each candidate component is determined by using the sight start point as a start point and the collision point of each candidate component as an end point. The first included angle between the collision direction of each candidate component and the sight direction is determined.

A smaller first included angle indicates that a position of the component is closer to the sight direction. Generally, a position of the component that the user actually sees is closer to the sight direction, and the greater the possibility that the component is a component that the user actually wants to interact with.

Figure 12:
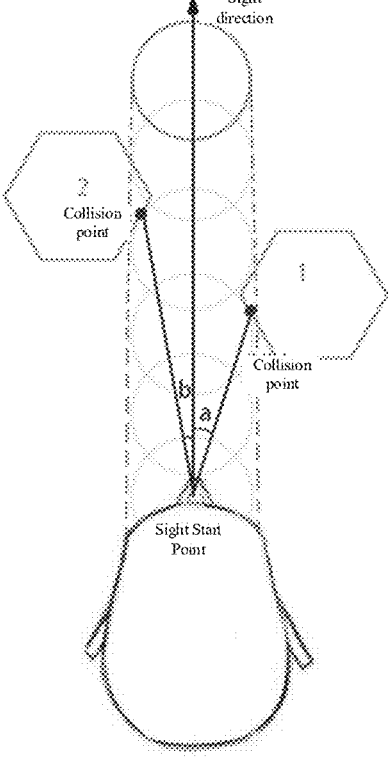
FIG. 12 is a schematic diagram of a first included angle between a collision direction of a candidate component and a sight direction.

FIG. 12 is a schematic diagram of a first included angle between a collision direction of a candidate component and a sight direction. As shown in FIG. 12, a collision detector is cylindrical, and the collision detector collides with a component 1 and a component 2 in an extended reality space. A first included angle between the collision direction of the component 1 and the sight direction is a, a first included angle between the collision direction of the component 2 and the sight direction is b, and b is less than a. Therefore, the component 2 is more likely to be a component that the user actually wants to interact with.

(3) Second Distance

The second distance is used to represent a distance between the collision point of the candidate component and a center point of the candidate component. The second distance between the collision point and the center point of each candidate component is calculated based on the position of the collision point and the position of the center point of each candidate component.

A smaller second distance indicates that the collision point of the component is closer to the center point. Generally, a position of the component that the user actually sees is closer to a center of the component, and the greater the possibility that the component is a component that the user actually wants to interact with.

Figure 13:
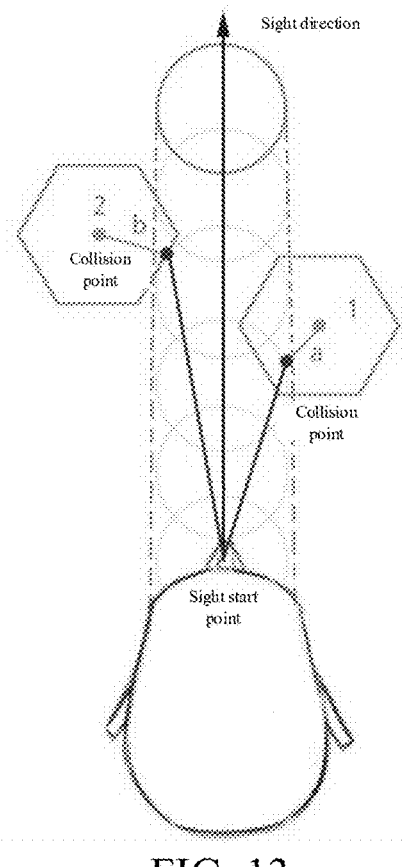
FIG. 13 is a schematic diagram of a second distance between a collision point of a candidate component and a center point of the candidate component.

FIG. 13 is a schematic diagram of a second distance between a collision point of a candidate component and a center point of the candidate component. As shown in FIG. 13, a collision detector is cylindrical, and the collision detector collides with a component 1 and a component 2 in an extended reality space. A second distance between the collision point and the center point of the component 1 is a, a second distance between the collision point and the center point of the component 2 is b, and a is less than b. Therefore, the component 1 is more likely to be a component that the user actually wants to interact with.

(4) Second Included Angle

The second included angle is an included angle between a center direction of the candidate component and the sight direction. The center direction of each candidate component is determined by using the sight start point as a start point and the center point of each candidate component as an end point. Then, the second included angle between the center direction of each candidate component and the sight direction is determined.

A smaller second included angle indicates that an angle at which a sight of the user deviates from a center position of the component is smaller. Generally, the smaller the angle at which the sight of the user deviates from the center position of the component, the greater the possibility that the component is a component that the user actually wants to interact with.

Figure 14:
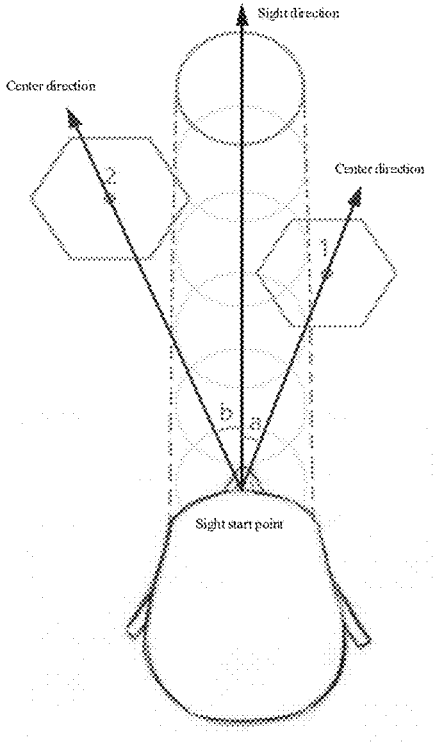
FIG. 14 is a schematic diagram of a second included angle between a center direction of a candidate component and a sight direction.

FIG. 14 is a schematic diagram of a second included angle between a center direction and a sight direction of a candidate component. As shown in FIG. 14, a collision detector is cylindrical, and the collision detector collides with a component 1 and a component 2 in an extended reality space. A second included angle between the center direction of the component 1 and the sight direction is a, a second included angle between the center direction of the component 2 and the sight direction is b, and a is less than b. Therefore, the component 1 is more likely to be a component that the user actually wants to interact with.

After the first distance, the first included angle, the second distance, and the second included angle of each candidate component are obtained, weighted operation is performed based on preset weights to obtain the interactive score of each candidate component. For example, a weight of the first distance is 1, a weight of the first included angle is 1, a weight of the second distance is 0.5, and a weight of the second included angle is 0.3. It may be understood that the weights are described here only for reference, and values of the weights may be determined based on an actual situation.

In the foregoing example, the XR device performs weighted operation based on the first distance, the first included angle, the second distance, and the second included angle of each candidate component to obtain the interactive score. Optionally, in another embodiment of this application, the XR device may also perform weighted operation based on some of the first distance, the first included angle, the second distance, and the second included angle of the candidate component to obtain the interactive score. For example, weighted operation may be performed based on at least two or at least three of the first distance, the first included angle, the second distance, and the second included angle of the candidate component.

For example, weighted operation is performed based on the first distance and the first included angle of the candidate component to obtain the interactive score, or weighted operation is performed based on the first distance, the first included angle, and the second distance of the candidate component to obtain the interactive score, or weighted operation is performed based on the first distance, the first included angle, and the second included angle of the candidate component to obtain the interactive score. Details are not described here again.

S1043: Determine the interactive component from the plurality of candidate components based on the interactive score of each of the candidate components.

The XR device sorts the interactive scores of the plurality of candidate components, and determines a candidate component with a highest score as the interactive component.

In this embodiment, the collision point of the candidate component is determined based on the position of the candidate component and the sight direction, the interactive score of the candidate component is determined based on the position relationship between the collision point of each candidate component and the sight start point, the sight direction, and the center point of each candidate component, and the interactive component is determined from the plurality of candidate components based on the interactive score of each of the candidate components. The interactive component determined in this manner is more accurate, thereby improving accuracy of eye tracking.

Based on Embodiment 1 and Embodiment 2, Embodiment 3 of this application provides an eye tracking method. FIG. 15 is a flowchart of the eye tracking method according to Embodiment 3 of this application. As shown in FIG. 15, the method provided in this embodiment includes the following steps.

S201: Select a 2D interactive panel in an extended reality space based on an eye movement parameter, where the eye movement parameter includes a sight start point and a sight direction of a user.

Optionally, after the 2D interactive panel is selected, the 2D interactive panel may be highlighted, or the 2D interactive panel is in a hover state.

S202: Obtain a fixation point of a sight on the interactive panel and a size parameter of a collision detection area on the interactive panel.

S203: Determine a position of the collision detection area based on a position of the fixation point and the size parameter of the collision detection area.

S204: Display the collision detection area based on the position of the collision detection area.

This step is an optional step. After the position of the collision detection area is determined, the collision detection area may alternatively not be displayed, that is, the collision detection area is invisible to the user. The collision detection area is displayed, so that the user can conveniently and timely learn a current fixation position of the eye.

Optionally, the collision detection area is suspended over the interactive panel and is semi-transparent to avoid blocking components in the 2D interactive panel and affecting user operations and experience.

When the collision detection area is a circle or an ellipse, a halo effect or another effect may be used for the collision detection area.

S205: Determine an interactive candidate component collided with the collision detection area based on the position of the collision detection area and positions of interactive components on the interactive panel.

It should be noted that there is no sequence for execution of step S204 and step S25. Step S204 may be performed first and then step S205 is performed; or step S205 may be performed first and then step S204 is performed; or step S204 and step S205 may be performed simultaneously.

S206: Filter the plurality of candidate components based on a hierarchical relationship between components in the interactive panel.

The 2D interactive panel includes various controls and sub-windows. The components have a hierarchical relationship under the same Z-axis offset. The hierarchical relationship is used to control a priority and a display sequence of windows. In an actual scenario, the user is more likely to select a component that is in a foreground instead of a component that is in a background. Some candidate components with a low possibility of interaction are filtered out based on the hierarchical relationship between the components in the 2D interactive panel.

The hierarchical relationship between the components includes a nesting relationship, which is also referred to as a parent-child relationship or an inclusion relationship. Components in the 2D interactive panel may include a plurality of layers of nesting relationships.

For example, when it is determined that the hierarchical relationship between the plurality of candidate components is a nesting relationship based on the hierarchical relationship between the components in the interactive panel, a candidate component located at a bottom layer is filtered out, and a candidate component located at a top layer is retained. For example, a component B is nested in or contained in a component A, the component A is a bottom-layer component, and the component B is an upper-layer component. In this case, the component A may be filtered out.

Optionally, the plurality of candidate components may be filtered based on the hierarchical relationship between the components in the interactive panel when the radius of the sphere is less than a preset value. When the radius of the sphere is less than the preset value, a field of view angle formed by a sight of the user and the collision detection area is small. The field of view angle is an included angle formed by connecting lines between a sight start point of the user and two farthest points of the collision detection area. Therefore, the plurality of candidate components may also be filtered based on the hierarchical relationship between the components in the interactive panel when the field of view angle of the user is less than the preset value.

Figure 16:
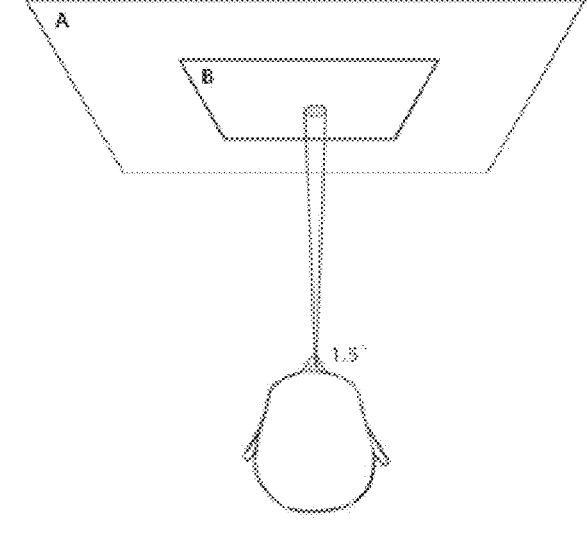
FIG. 16 is a schematic diagram of a hierarchical relationship between two candidate components.

FIG. 16 is a schematic diagram of a hierarchical relationship between two candidate components. As shown in FIG. 16, the component B is nested in or contained in the component A, and the radius of the sphere is small or the field of view angle of the user is small. For example, the field of view angle of the user is 1.5 degrees. In this case, if both the component A and the component B are used as the candidate components, the component A may be filtered out. The component A is no longer involved in subsequent processing, and only the component B is retained for subsequent processing.

Figure 17:
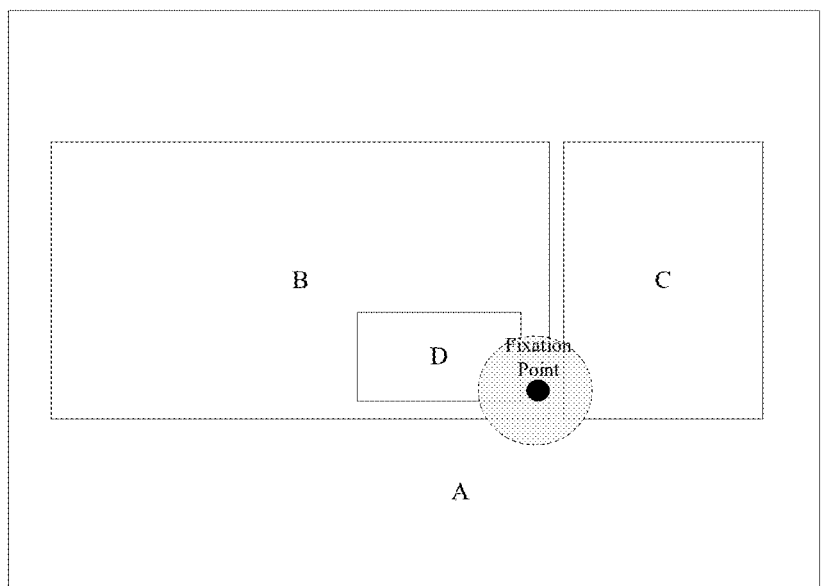
FIG. 17 is a schematic diagram of a hierarchical relationship between a plurality of candidate components.

FIG. 17 is a schematic diagram of a hierarchical relationship between a plurality of candidate components. As shown in FIG. 17, there are four candidate components. The four candidate components have two layers of nesting relationships. A component D is nested in a component B, the component B is further nested in a component A, and a component C is nested in the component A. After filtering is performed based on the hierarchical relationship, the component A and the component B are filtered out, and only the component C and the component D are retained.

By filtering the candidate components based on the hierarchical relationship between the components, some components that are in a background can be filtered out, and the number of candidate components that are involved in subsequent calculation of the interactive score is reduced. Therefore, calculation energy consumption required for calculating the interactive score of the candidate component subsequently can be reduced, and accuracy of determining an interaction intention of the user can also be improved.

S207: When there are a plurality of candidate components in the interactive panel, determine one interactive component from the plurality of candidate components based on position relationships between the plurality of candidate components and the sight start point, the sight direction.

In this embodiment, before determining one interactive component from the plurality of candidate components based on the position relationships between the plurality of candidate components and the sight start point, the sight direction, the plurality of candidate components are filtered based on the hierarchical relationship between the components in the interactive panel, so that some components that are in a background are filtered out, and the number of candidate components that are involved in subsequent calculation of the interactive score is reduced. Therefore, calculation energy consumption required for calculating the interactive scores of the candidate components subsequently can be reduced, and accuracy of determining an interaction intention of the user can also be improved.

Figure 18:
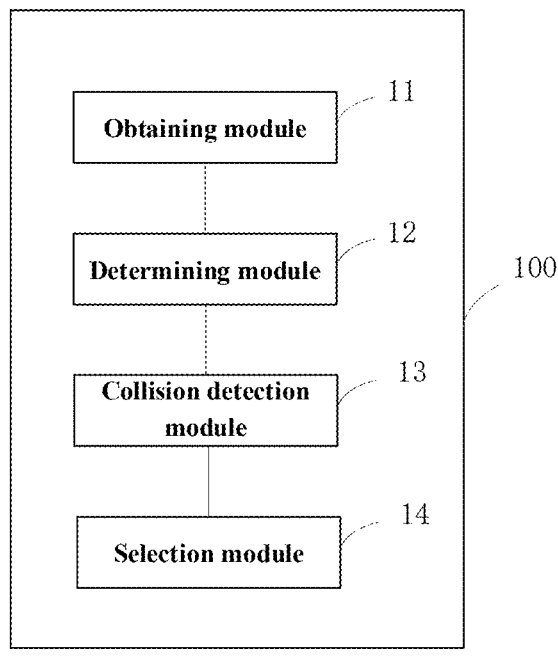
FIG. 18 is a schematic diagram of a structure of an eye tracking apparatus according to Embodiment 4 of this application.

To better implement the eye tracking method in this embodiment of the application, this embodiment of the application further provides an eye tracking apparatus. FIG. 18 is a schematic structural diagram of an eye tracking apparatus according to Embodiment 4 of this application. As shown in FIG. 18, the eye tracking apparatus 100 may include:

an obtaining module 11, configured to obtain a sight start point, a sight direction, a fixation point of a sight on a two-dimensional (2D) interactive panel in an extended reality space of a user, and a size parameter of a collision detection area on the interactive panel, where the collision detection area is a 2D graphic;

a determining module 12, configured to determine a position of the collision detection area based on a position of the fixation point and the size parameter of the collision detection area;

a collision detection module 13, configured to determine an interactive candidate component collided with the collision detection area based on the position of the collision detection area and positions of interactive components on the interactive panel;

a selection module 14, configured to, when there are a plurality of candidate components in the interactive panel, determine one interactive component from the plurality of candidate components based on position relationships between the plurality of candidate components and the sight start point, the sight direction.

In an optional implementation, the collision detection module 13 is specifically configured to:

determine a plurality of sampling points in the collision detection area according to a preset sampling manner;

determine an interactive component that contains the sampling points as the candidate component based on positions of the sampling points and the positions of the interactive components.

In an optional implementation, the size parameter of the collision detection area is a radius of a sphere;

the determining module 12 is specifically configured to determine a circular or elliptical collision detection area based on the radius of the sphere and using the position of the fixation point as a center point.

In an optional implementation, the collision detection area is a square or rectangular area;

the collision detection module 13 is specifically configured to:

determine whether the interactive components collide with the square or rectangular collision detection area based on the position of the square or rectangular collision detection area and the positions of the interactive components;

when the interactive components collide with the square or rectangular collision detection area, determine the interactive components as the candidate components.

In an optional implementation, the size parameter of the collision detection area is a radius of a sphere;

the determining module 12 is specifically configured to:

determine a length of a major axis of an ellipse or a diameter of a circle formed when the sphere is projected onto the interactive panel based on the radius of the sphere and an included angle between the sight direction and the interactive panel;

determine the square or rectangular collision detection area based on the length of the major axis of the ellipse or the diameter of the circle and using the position of the fixation point as a center point.

In an optional implementation, the apparatus further includes:

a filtering module, configured to filter the plurality of candidate components based on a hierarchical relationship between components in the interactive panel.

In an optional implementation, the filtering module is specifically configured to:

when it is determined that the hierarchical relationship between the plurality of candidate components is a nesting relationship based on the hierarchical relationship between the components in the interactive panel, filter out a candidate component located at a bottom layer.

In an optional implementation, the selection module 14 is specifically configured to:

determine collision points of the plurality of candidate components, where the collision points are points on the candidate components that are closest to the sight direction;

determine an interactive score of each candidate component based on a position relationship between the collision point of each candidate component and the sight start point, the sight direction, and a center point of each candidate component;

determine the interactive component from the plurality of candidate components based on the interactive score of each of the candidate components.

In an optional implementation, the selection module 14 is specifically configured to:

traverse the plurality of candidate components, and when the fixation point is located in a current candidate component, determine the fixation point as a collision point of the current candidate component;

when the fixation point is located outside the current candidate component, determine a first point in the current candidate component that is closest to the sight direction;

determine the first point as the collision point of the current candidate component.

In an optional implementation, the selection module 14 is specifically configured to:

if a distance between the sight direction and the first point is less than or equal to a first distance threshold, determine the first point as the collision point of the current candidate component, where the first distance threshold is determined based on a size of the collision detection area;

if the distance between the sight direction and the first point is greater than the first distance threshold, filter out the current candidate component.

In an optional implementation, the selection module 14 is specifically configured to:

when the current candidate component is blocked by a first candidate component, determine a boundary of an unblocked part of the current candidate component based on a position of the first candidate component;

determine a first point in the unblocked part of the current candidate component that is closest to the sight direction.

In an optional implementation, the selection module 14 is specifically configured to:

calculate a first distance between the collision point of each candidate component and the sight start point based on the position of the sight start point and the position of the collision point of each candidate component;

determine a collision direction of each candidate component by using the sight start point as a start point and the collision point of each candidate component as an end point, and determine a first included angle between the collision direction of each candidate component and the sight direction;

calculate a second distance between the collision point and a center point of each candidate component based on the position of the collision point and the position of the center point of each candidate component;

determine a center direction of each candidate component by using the sight start point as a start point and the center point of each candidate component as an end point, and determine a second included angle between the center direction of each candidate component and the sight direction;

perform weighted operation based on the first distance, the first included angle, the second distance, and the second included angle of each candidate component to obtain the interactive score of each candidate component.

In an optional implementation, the apparatus further includes:

a selection module, configured to select the interactive panel based on an eye movement parameter.

In an optional implementation, the apparatus further includes:

a display module, configured to display the collision detection area based on the position of the collision detection area.

In an optional implementation, the collision detection area is suspended over the interactive panel and is semi-transparent.

It should be understood that the apparatus embodiment may correspond to the method embodiment, and for similar descriptions, reference may be made to the method embodiment. To avoid repetition, details are not described herein again.

The apparatus 100 in the embodiments of this application is described above with reference to the accompanying drawings from the perspective of a functional module. It should be understood that the functional module may be implemented in the form of hardware, or may be implemented by instructions in the form of software, or may be implemented by a combination of hardware and software modules. Specifically, each step in the method embodiment in the embodiments of this application may be completed by an integrated logic circuit of hardware in a processor and/or instructions in the form of software, and the steps of the method disclosed in the embodiments of this application may be directly embodied as being completed by a hardware decoding processor, or completed by a combination of the hardware and a software module in the decoding processor.

Optionally, the software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the method embodiment based on the hardware of the processor.

Figure 19:
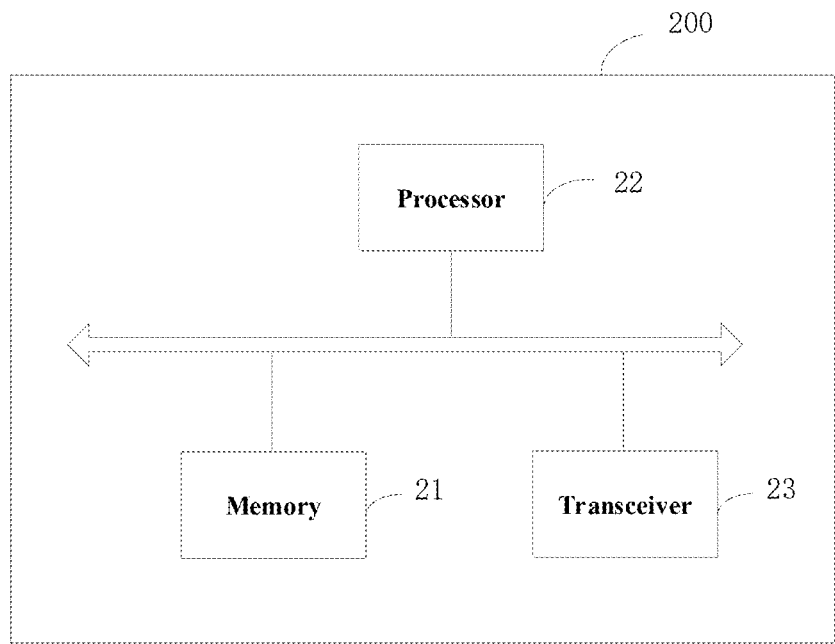
FIG. 19 is a schematic diagram of a structure of an XR device according to Embodiment 5 of this application.

This embodiment of the application further provides an XR device. FIG. 19 is a schematic diagram of a structure of an XR device according to Embodiment 5 of this application. As shown in FIG. 19, the XR device 200 may include:

a memory 21 and a processor 22, where the memory 21 is configured to store a computer program, and transmit program code to the processor 22. In other words, the processor 22 may invoke and run the computer program from the memory 21 to implement the method in the embodiments of this application.

For example, the processor 22 may be configured to perform the foregoing method embodiment based on instructions in the computer program.

In some embodiments of this application, the processor 22 may include but is not limited to:

a general-purpose processor, a digital signal processor (DSP), an application specific integrated circuit (ASIC), a field programmable gate array (FPGA) or another programmable logic device, a discrete gate or transistor logic device, or a discrete hardware component.

In some embodiments of this application, the memory 21 includes but is not limited to:

a volatile memory and/or a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), which is used as an external cache. By way of example but not limitation, many forms of RAM are available, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synch link dynamic random access memory (synch link DRAM, SLDRAM), and a direct rambus random access memory (Direct Rambus RAM, DR RAM).

In some embodiments of this application, the computer program may be divided into one or more modules. The one or more modules are stored in the memory 21, and are executed by the processor 22, to complete the method provided in this application. The one or more modules may be a series of computer program instruction segments that can perform specific functions, and the instruction segments are used to describe an execution process of the computer program in the XR device.

As shown in FIG. 19, the XR device may further include:

a transceiver 23, where the transceiver 23 may be connected to the processor 22 or the memory 21.

The processor 22 may control the transceiver 23 to communicate with another device. Specifically, the transceiver 23 may send information or data to another device, or receive information or data sent by another device. The transceiver 23 may include a transmitter and a receiver. The transceiver 23 may further include an antenna, and a quantity of antennas may be one or more.

It may be understood that although not shown in FIG. 19, the XR device 200 may further include a camera module, a Wi-Fi module, a positioning module, a Bluetooth module, a display, a controller, and the like, which are not described herein again.

It should be understood that each of the components in the XR device is connected to each other through a bus system. In addition to a data bus, the bus system further includes a power bus, a control bus, and a status signal bus.

This application further provides a computer storage medium storing a computer program. When the computer program is executed by a computer, the computer is enabled to perform the method in the above method embodiment. In other words, this embodiment of the application further provides a computer program product including instructions. When the instructions are executed by a computer, the computer is enabled to perform the method in the above method embodiment.

This application further provides a computer program product. The computer program product includes a computer program, and the computer program is stored in a computer-readable storage medium. A processor of an XR device reads the computer program from the computer-readable storage medium, and executes the computer program, so that the XR device executes a corresponding procedure in the method for controlling a user position in a virtual scene in the embodiments of this application. For the sake of brevity, details are not described herein again.

In the several embodiments provided in this application, it should be understood that the disclosed system, apparatus, and method may be implemented in other manners. For example, the described apparatus embodiments are merely examples. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electrical, mechanical, or other forms.

Modules described as separate parts may or may not be physically separate, and parts displayed as modules may or may not be physical modules, and may be located at one position, or may be distributed on a plurality of network units. Some or all of the modules may be selected based on actual requirements to achieve the objectives of the solutions of the embodiments. For example, each of the functional modules in each of the embodiments of this application may be integrated into one processing module, or may exist alone physically, or two or more modules may be integrated into one module.

The foregoing is merely specific implementations of this application, but is not intended to limit the protection scope of this application. Any variation or replacement readily conceived by a person skilled in the art within the technical scope disclosed in this application shall fall within the protection scope of this application. Therefore, the protection scope of this application shall be subject to the protection scope of the claims.

What is claimed is:

1. An eye tracking method, comprising:
obtaining a sight start point, a sight direction, a fixation point of a sight on a two-dimensional (2D) interactive panel in an extended reality space of a user, and a size parameter of a collision detection area on the interactive panel, wherein the collision detection area is a 2D graphic;
determining a position of the collision detection area based on a position of the fixation point and the size parameter of the collision detection area;
determining an interactive candidate component collided with the collision detection area based on the position of the collision detection area and positions of interactive components on the interactive panel; and
when there are a plurality of candidate components in the interactive panel, determining one interactive component from the plurality of candidate components based on position relationships between the plurality of candidate components and the sight start point, and the sight direction, wherein
the size parameter of the collision detection area is a radius of a sphere, and
the determining a position of the collision detection area based on a position of the fixation point and the size parameter of the collision detection area comprises:
determining the collision detection area based on the radius of the sphere and using the position of the fixation point as a center point.

2. The method according to claim 1, wherein the determining an interactive candidate component collided with the collision detection area based on the position of the collision detection area and positions of interactive components on the interactive panel comprises:
determining a plurality of sampling points in the collision detection area according to a preset sampling manner; and
determining an interactive component that contains the sampling point as the candidate component based on positions of the sampling points and the positions of the interactive components.

3. The method according to claim 1, wherein the collision detection area is a circular or elliptical area.

4. The method according to claim 1, wherein
the collision detection area is a square or rectangular area, and
the determining an interactive candidate component collided with the collision detection area based on the position of the collision detection area and positions of interactive components on the interactive panel comprises:
determining whether the interactive component collides with the square or rectangular collision detection area based on the position of the square or rectangular collision detection area and the positions of the interactive component;
when the interactive component collides with the square or rectangular collision detection area, determining that the interactive component is the candidate component.

5. The method according to claim 4, wherein
the determining the collision detection area based on the radius of the sphere and using the position of the fixation point as a center point comprises:
determining a length of a major axis of an ellipse or a diameter of a circle formed by projecting the sphere onto the interactive panel based on the radius of the sphere and an included angle between the sight direction and the interactive panel; and determining the square or rectangular collision detection area based on the length of the major axis of the ellipse or the diameter of the circle and using the position of the fixation point as a center point.

6. The method according to claim 1, wherein, before the when there are a plurality of candidate components in the interactive panel, determining one interactive component from the plurality of candidate components based on position relationships between the plurality of candidate components and the sight start point, and the sight direction, the method further comprises:

filtering the plurality of candidate components based on a hierarchical relationship between components in the interactive panel.

7. The method according to claim 6, wherein the filtering the plurality of candidate components based on a hierarchical relationship between components in the interactive panel comprises:

when it is determined that the hierarchical relationship between the plurality of candidate components is a nesting relationship based on the hierarchical relationship between the components in the interactive panel, filtering out the candidate component located at a bottom layer.

8. The method according to claim 1, wherein the determining one interactive component from the plurality of candidate components based on position relationships between the plurality of candidate components and the sight start point, and the sight direction comprises:

determining collision points of the plurality of candidate components, wherein the collision points are points on the candidate components that are closest to the sight direction;

determining an interactive score of each candidate component based on a position relationship between the collision point of the candidate component and the sight start point, the sight direction, and center point of the candidate component; and determining the interactive component from the plurality of candidate components based on the interactive score of each candidate component.

9. The method according to claim 8, wherein the determining collision points of the plurality of candidate components comprises:

traversing the plurality of candidate components, and when the fixation point is located in a current candidate component, determining the fixation point as a collision point of the current candidate component;

when the fixation point is located outside the current candidate component, determining a first point in the current candidate component that is closest to the sight direction; and determining the first point as the collision point of the current candidate component.

10. The method according to claim 9, wherein the determining the first point as the collision point of the current candidate component comprises:

if a distance between the sight direction and the first point is less than or equal to a first distance threshold, determining the first point as the collision point of the current candidate component, wherein the first distance threshold is determined based on the size of the collision detection area; and if the distance between the sight direction and the first point is greater than the first distance threshold, filtering out the current candidate component.

11. The method according to claim 9, wherein the determining a first point in the current candidate component that is closest to the sight direction comprises:

if the current candidate component is blocked by a first candidate component, determining a boundary of an unblocked part of the current candidate component based on a position of the first candidate component; and determining a first point in the unblocked part of the current candidate component that is closest to the sight direction.

12. The method according to claim 8, wherein the determining an interactive score of each candidate component based on a position relationship between the collision point of the candidate component and the sight start point, the sight direction, and a center point of the candidate component comprises:

calculating a first distance between the collision point of each candidate component and the sight start point based on the position of the sight start point and the position of the collision point of the candidate component;

determining a collision direction of each candidate component using the sight start point as a start point and the collision point of the candidate component as an end point, and determining a first included angle between the collision direction of each candidate component and the sight direction;

calculating a second distance between the collision point and the center point of each candidate component based on the position of the collision point and a position of the center point of the candidate component;

determining a center direction of each candidate component using the sight start point as a start point and the center point of the candidate component as an end point, and determining a second included angle between the center direction of the candidate component and the sight direction; and performing a weighted operation on the first distance, the first included angle, the second distance, and the second included angle of each candidate component to obtain the interactive score of the candidate component.

13. The method according to claim 1, wherein, before the obtaining a sight start point, a sight direction, a fixation point of a sight on a two-dimensional (2D) interactive panel in an extended reality space of a user, and a size parameter of a collision detection area on the interactive panel, the method further comprises:

selecting the interactive panel based on an eye movement parameter.

14. The method according to claim 1, wherein, after the determining a position of the collision detection area based on a position of the fixation point and the size parameter of the collision detection area, the method further comprises:

displaying the collision detection area based on the position of the collision detection area.

15. The method according to claim 14, wherein the collision detection area is suspended on the interactive panel, and the collision detection area is translucent.

16. An extended reality device, comprising:

a processor and a memory, wherein the memory is configured to store a computer program, and the processor is configured to call and run the computer program stored in the memory to perform an eye tracking method, comprising:

obtaining a sight start point, a sight direction, a fixation point of a sight on a two-dimensional (2D) interactive panel in an extended reality space of a user, and a size parameter of a collision detection area on the interactive panel, wherein the collision detection area is a 2D graphic;

determining a position of the collision detection area based on a position of the fixation point and the size parameter of the collision detection area;

determining an interactive candidate component collided with the collision detection area based on the position of the collision detection area and positions of interactive components on the interactive panel; and when there are a plurality of candidate components in the interactive panel, determining one interactive component from the plurality of candidate components based on position relationships between the plurality of candidate components and the sight start point, and the sight direction, wherein the size parameter of the collision detection area is a radius of a sphere, and the determining a position of the collision detection area based on a position of the fixation point and the size parameter of the collision detection area comprises:

determining the collision detection area based on the radius of the sphere and using the position of the fixation point as a center point.

17. The extended reality device according to claim 16, wherein the determining an interactive candidate component collided with the collision detection area based on the position of the collision detection area and positions of interactive components on the interactive panel comprises:

determining a plurality of sampling points in the collision detection area according to a preset sampling manner; and determining an interactive component that contains the sampling point as the candidate component based on positions of the sampling points and the positions of the interactive components.

18. The extended reality device according to claim 17, wherein the collision detection area is a circular or elliptical area.

19. A non-transitory computer-readable storage medium, being configured to store a computer program, wherein the computer program enables a computer to perform an eye tracking method, comprising:

obtaining a sight start point, a sight direction, a fixation point of a sight on a two-dimensional (2D) interactive panel in an extended reality space of a user, and a size parameter of a collision detection area on the interactive panel, wherein the collision detection area is a 2D graphic;

determining a position of the collision detection area based on a position of the fixation point and the size parameter of the collision detection area;

determining an interactive candidate component collided with the collision detection area based on the position of the collision detection area and positions of interactive components on the interactive panel; and when there are a plurality of candidate components in the interactive panel, determining one interactive component from the plurality of candidate components based on position relationships between the plurality of candidate components and the sight start point, and the sight direction, wherein the size parameter of the collision detection area is a radius of a sphere, and the determining a position of the collision detection area based on a position of the fixation point and the size parameter of the collision detection area comprises:

determining the collision detection area based on the radius of the sphere and using the position of the fixation point as a center point.

20. The non-transitory computer-readable storage medium according to claim 19, wherein the determining an interactive candidate component collided with the collision detection area based on the position of the collision detection area and positions of interactive components on the interactive panel comprises:

determining a plurality of sampling points in the collision detection area according to a preset sampling manner; and determining an interactive component that contains the sampling point as the candidate component based on positions of the sampling points and the positions of the interactive components.

* * * * *